(12) United States Patent
Bosworth et al.

(10) Patent No.: US 9,762,956 B2
(45) Date of Patent: Sep. 12, 2017

(54) IMAGE SELECTION FROM CAPTURED VIDEO SEQUENCE BASED ON SOCIAL COMPONENTS

(71) Applicants: Andrew Garrod Bosworth, San Mateo, CA (US); David Harry Garcia, Sunnyvale, CA (US); Oswald Soleio Cuervo, Los Altos, CA (US)

(72) Inventors: Andrew Garrod Bosworth, San Mateo, CA (US); David Harry Garcia, Sunnyvale, CA (US); Oswald Soleio Cuervo, Los Altos, CA (US)

(73) Assignee: Facebook, Inc., Menlo Park, CA (US)

(*) Notice: Subject to any disclaimer, the term of this patent is extended or adjusted under 35 U.S.C. 154(b) by 897 days.

(21) Appl. No.: 13/857,075

(22) Filed: Apr. 4, 2013

(65) Prior Publication Data
US 2013/0227603 A1   Aug. 29, 2013

Related U.S. Application Data

(63) Continuation of application No. 13/276,389, filed on Oct. 19, 2011, now Pat. No. 8,442,265.

(51) Int. Cl.
*H04N 21/44* (2011.01)
*G06F 17/30* (2006.01)
*H04N 1/21* (2006.01)
*G06K 9/00* (2006.01)

(52) U.S. Cl.
CPC ... *H04N 21/44008* (2013.01); *G06F 17/3079* (2013.01); *G06F 17/30846* (2013.01); *G06F 17/30849* (2013.01); *G06K 9/00677* (2013.01); *G06K 9/00711* (2013.01); *H04N 1/2145* (2013.01); *H04N 21/44* (2013.01); *H04N 2201/212* (2013.01)

(58) Field of Classification Search
CPC .......... H04N 1/2145; H04N 21/44008; H04N 21/44; H04N 2201/212; G06F 17/3079; G06F 17/30793; G06F 17/30846; G06F 17/30849; G06K 9/00677; G06K 9/00711
See application file for complete search history.

(56) References Cited

U.S. PATENT DOCUMENTS

| | | | |
|---|---|---|---|
| 6,647,535 B1 | 11/2003 | Bozdagi | |
| 6,678,413 B1* | 1/2004 | Liang | A61B 5/1113 348/169 |
| 7,298,930 B1* | 11/2007 | Erol | G06K 9/00711 382/305 |
| 7,945,862 B2* | 5/2011 | Aldrich | G06Q 50/01 705/319 |
| 8,156,115 B1* | 4/2012 | Erol | G06T 5/009 382/181 |
| 8,180,804 B1* | 5/2012 | Narayanan | G06F 17/3053 707/798 |
| 8,185,558 B1* | 5/2012 | Narayanan | G06F 17/30958 707/798 |
| 8,234,218 B2* | 7/2012 | Robinson | G06F 3/04815 705/14.23 |

(Continued)

*Primary Examiner* — Manav Seth
(74) *Attorney, Agent, or Firm* — Baker Botts L.L.P.

(57) ABSTRACT

In one embodiment, a mobile device analyzes frames before and after a particular frame of a real-time video to identify one or more social network objects, and selects one or more frames before and after the particular frame based on social network information for further storage in the mobile device.

18 Claims, 6 Drawing Sheets

(56) References Cited

U.S. PATENT DOCUMENTS

| | | | | |
|---|---|---|---|---|
| 8,284,990 B2* | 10/2012 | Ma | | G06K 9/00335 348/169 |
| 8,301,498 B1* | 10/2012 | Cortes | | G06F 17/30784 700/52 |
| 8,302,013 B2* | 10/2012 | Garcia | | G06F 17/3089 715/743 |
| 8,307,395 B2* | 11/2012 | Issa | | G06F 17/30817 709/219 |
| 8,432,965 B2* | 4/2013 | Deever | | G06F 17/30781 375/240.01 |
| 8,437,500 B1* | 5/2013 | Bosworth | | G06F 17/3079 382/100 |
| 8,442,265 B1* | 5/2013 | Bosworth | | G06F 17/3079 382/100 |
| 8,571,330 B2* | 10/2013 | Gao | | G06F 17/30781 348/333.05 |
| 8,774,452 B2* | 7/2014 | Bosworth | | G06F 17/3079 382/100 |
| 8,774,528 B2* | 7/2014 | Hibino | | G06K 9/00671 382/112 |
| 8,984,626 B2* | 3/2015 | Barton | | G06Q 30/0244 379/88.01 |
| 9,286,641 B2* | 3/2016 | Bosworth | | G06Q 10/10 |
| 2002/0175932 A1* | 11/2002 | Yu | | G06F 17/30796 715/720 |
| 2006/0218225 A1* | 9/2006 | Hee Voon | | G06Q 30/02 709/201 |
| 2007/0006277 A1* | 1/2007 | Mills | | H04N 7/173 725/153 |
| 2009/0100151 A1* | 4/2009 | Fisher | | G06F 17/3002 709/219 |
| 2009/0254643 A1* | 10/2009 | Terheggen | | G06F 17/3005 709/223 |
| 2009/0265737 A1* | 10/2009 | Issa | | G06F 17/30817 725/38 |
| 2009/0292549 A1* | 11/2009 | Ma | | G06K 9/00335 705/319 |
| 2009/0307592 A1* | 12/2009 | Kalanithi | | G06F 3/002 715/716 |
| 2010/0088726 A1* | 4/2010 | Curtis | | G11B 27/034 725/45 |
| 2010/0179874 A1* | 7/2010 | Higgins | | G06K 9/00664 705/14.53 |
| 2010/0217645 A1* | 8/2010 | Jin | | G06Q 10/10 705/14.44 |
| 2011/0064318 A1* | 3/2011 | Gao | | G06F 17/30781 382/224 |
| 2011/0069229 A1 | 3/2011 | Lord | | |
| 2011/0113444 A1* | 5/2011 | Popovich | | G06F 17/3079 725/32 |
| 2011/0164827 A1* | 7/2011 | Reams | | G06Q 30/00 382/261 |
| 2011/0175923 A1* | 7/2011 | Mahajan | | G06T 11/60 345/522 |
| 2011/0246560 A1* | 10/2011 | Gibson | | G11B 27/105 709/203 |
| 2012/0096357 A1* | 4/2012 | Folgner | | G11B 27/34 715/726 |
| 2012/0189204 A1* | 7/2012 | Johnson | | G06F 17/30781 382/181 |

* cited by examiner

IMAGE SELECTION FROM CAPTURED VIDEO SEQUENCE BASED ON SOCIAL COMPONENTS

PRIORITY

This application is a continuation under 35 U.S.C. §120 of U.S. patent application Ser. No. 13/276,389, filed 19 Oct. 2011, which is incorporated herein by reference.

TECHNICAL FIELD

The present disclosure generally relates to methods of selecting frames including identified persons and objects in a video sequence based on social network information.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to methods of selecting images from a sequence of video frames based on social network information. These and other features, aspects, and advantages of the disclosure are described in more detail below in the detailed description and in conjunction with the following figures.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information.

Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

The social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

Figure 1:
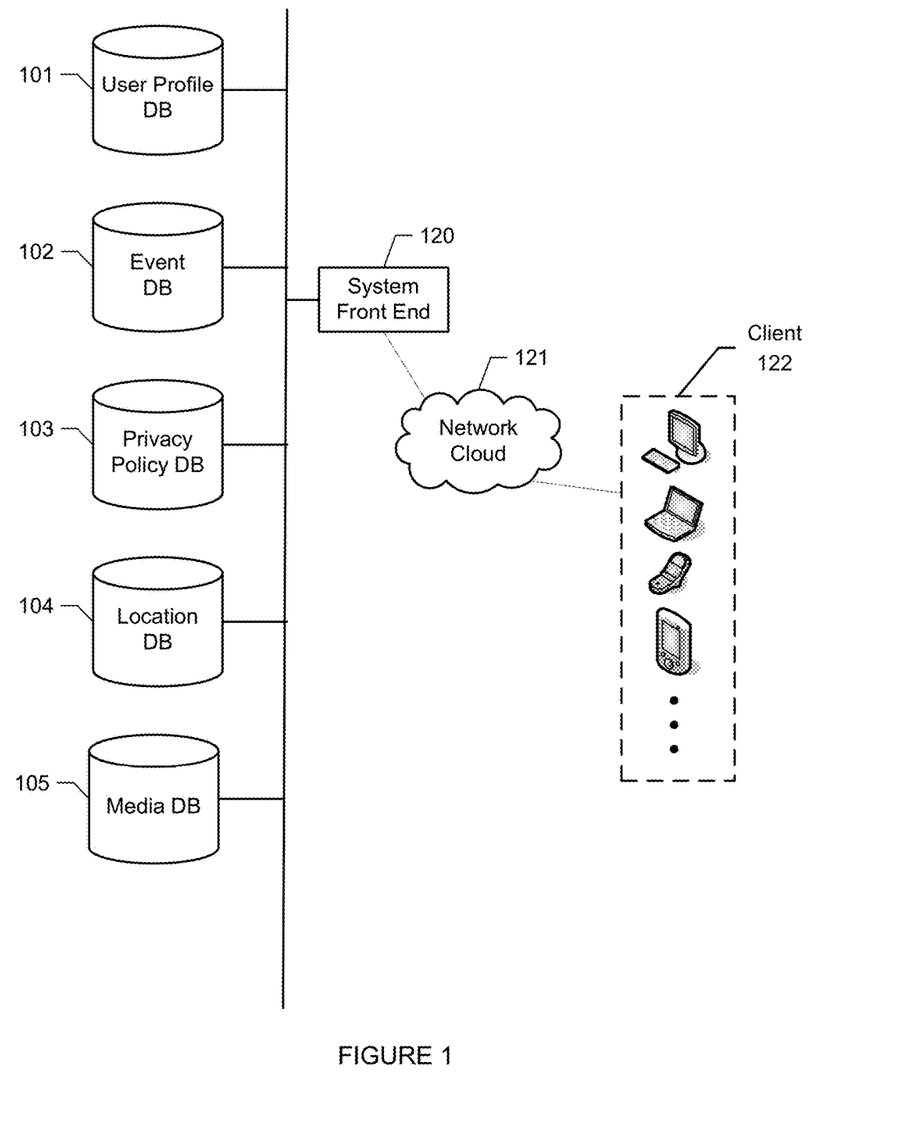
FIG. 1 illustrates an example social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, one or more web pages associated with the place and corresponding links to the one or more web pages, and the like). Places may be created by administrators of the system and/or created by users of the system. For example, a user may register a new place by accessing a client application to define a place name and provide a geographic location and cause the newly created place to be registered in location database 104. As described in U.S. patent application Ser. No. 12/763,171, information about a created place may be stored in a hub node in a social graph, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, a user of the social networking system may upload one or more media files to media database 105. For example, a user can upload a photo or a set of photos (often called a photo album), or a video clip (or an audio clip) to media database 105 from a client device 122 (e.g., a computer, or a camera phone). The user may further select one or more privacy settings for each of the uploaded media files (e.g., accessible to only first-degree connections, accessible to only first- and second-degree connections, accessible to all users of the social networking system). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during or in connection with an upload process. Some examples of tags of a media file are author, title, comments, event names, time, location, names of people appearing in the media file, or user comment. In one implementation, the client device 122 may implement the Exchangeable image file format (Exif), or a modified version thereof. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. U.S. Pat. No. 7,945,653, herein incorporated by reference in its entirety and for all purposes, describes methods of enabling a first user of a social networking system to select a region of a photo and associate the selected region to a second user, and in response to a confirmation from the second user, storing the association in a database. As described in U.S. patent application Ser. No. 12/763,171, the photo and related information (e.g., one or more privacy settings) may be stored in a particular node of a social graph, while the association between the photo and the second user may be stored in an edge connecting the particular node and a user node for the second user. For example, in response to a user's request, the social networking system may, based on the one or more privacy settings, display the photo with a tag corresponding to the second user, while the tag comprises a link to a webpage (e.g., a user profile page) associated with the second user. In particular embodiments, the social networking system may also extract metadata from a media file and store the metadata in media database 105.

Figure 2:
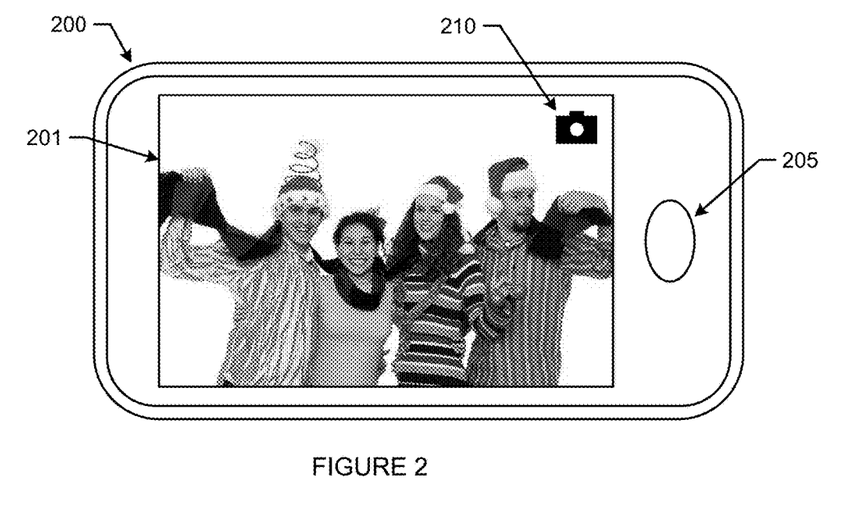
FIGS. 2 and 2A illustrate an example graphical user interface of a camera function of a mobile device.
Figure 2A:
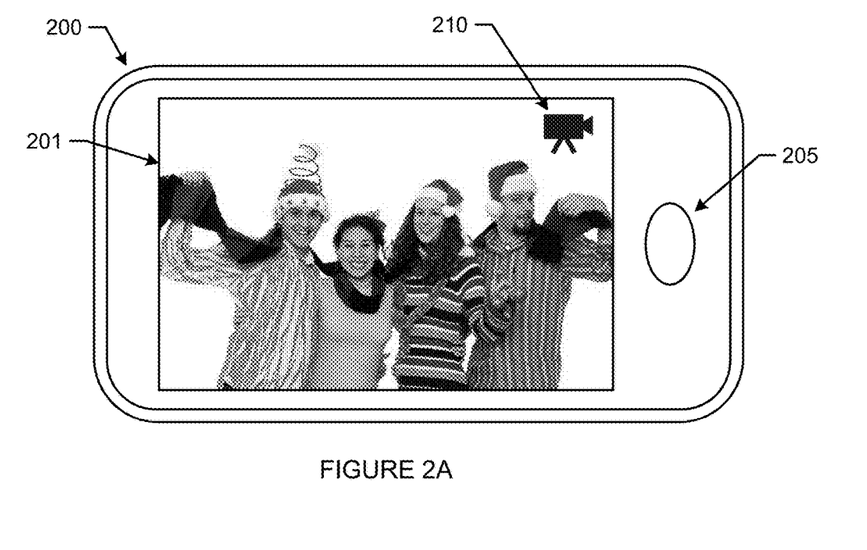

A digital camera or a camera function of a mobile device (e.g., a mobile phone, a tablet computer) often has photo-capturing and video-capturing as two separate operating modes. FIGS. 2 and 2A illustrate an example graphical user interface of a camera function provided by a mobile device. In the examples of FIGS. 2 and 2A, a graphical user interface 201 of a camera function of a mobile device 200 may comprise a viewfinder of the camera function and a selectable icon 210 indicating an operating mode of the camera function. For example, a user can select icon 210 to switch between a photo-capturing mode, a video-capturing mode, or other operating modes of the camera function. In the example of FIG. 2, the camera function of mobile device 200 is in a photo-capturing mode, as indicated by selectable icon 210. For example, a user of mobile device 200 can aim at one or more desired objects, as displayed in the viewfinder, and click on hardware button 205 (or a software button displayed in graphical user interface 201), causing the camera function to capture a photo and store the photo in a local storage (e.g., an SD card or FLASH memory) of mobile device 200. In the example of FIG. 2A, the camera function of mobile device 200 is in a video-capturing mode, as indicated by selectable icon 210. For example, a user of mobile device 200 can aim at one or more desired objects, as displayed in the viewfinder, and click on hardware button 205 (or a software button displayed in graphical user interface 201), causing the camera function to start recording a video and store the real-time video in a buffer. For example, the buffer can be a software buffer as part of the camera function being executed by one or more processors of mobile device 200. The user can subsequently click hardware button 205 again, causing the camera function to stop recording the video, and store the video segment in the buffer into a local storage (e.g., an SD card) of mobile device 200. Although a camera function of a mobile device operates in separate user modes for photo-capturing and video-capturing, the camera function may continuously capture video when the camera function is activated. For example, a viewfinder of a camera function of a mobile device can be a real-time video feed of the camera function. Particular embodiments herein describe methods of effectively utilizing real-time video capturing of a camera function of a mobile device. For example, a user may take a photo using the camera function of the mobile device. In addition to storing the captured photo in the mobile device, particular embodiments described herein can select one or more additional images relevant to the user from the real-time video captured by the camera function, and present the captured photo and the one or more additional images to the user in the camera function's graphical user interface.

Figure 3:
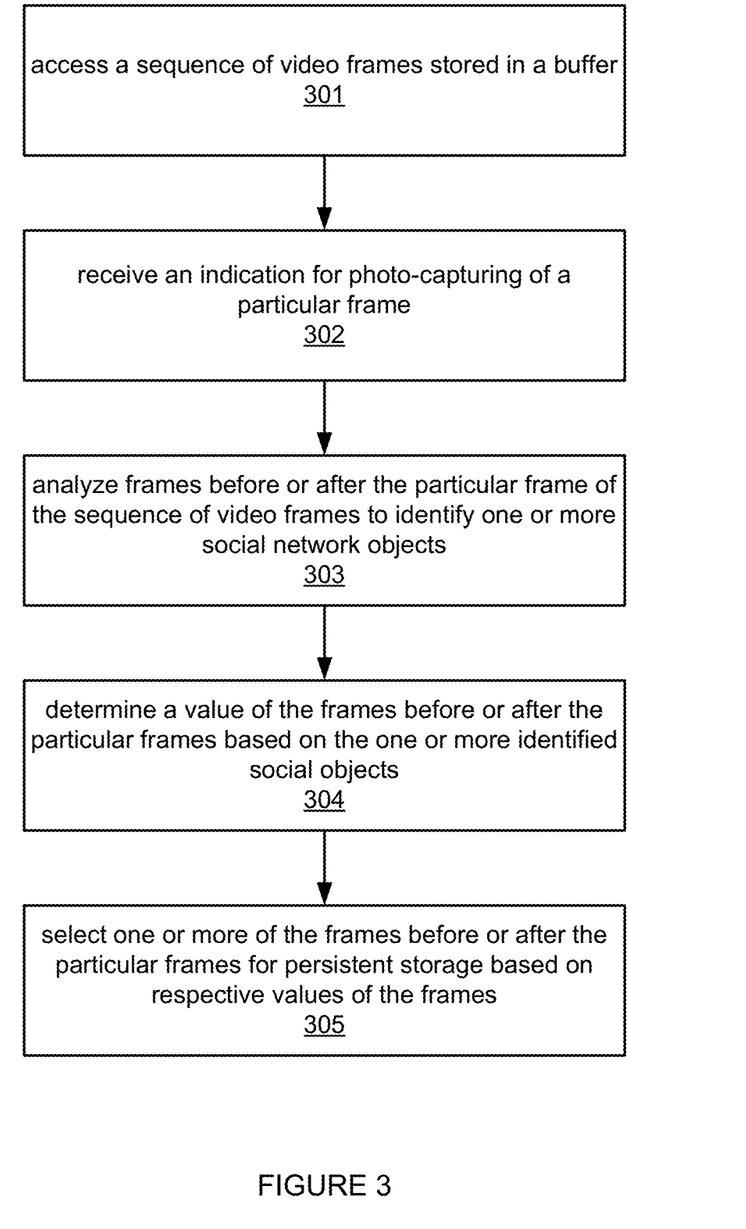
FIG. 3 illustrates an example method of selecting images from a captured video sequence based on social network information.
Figure 4:
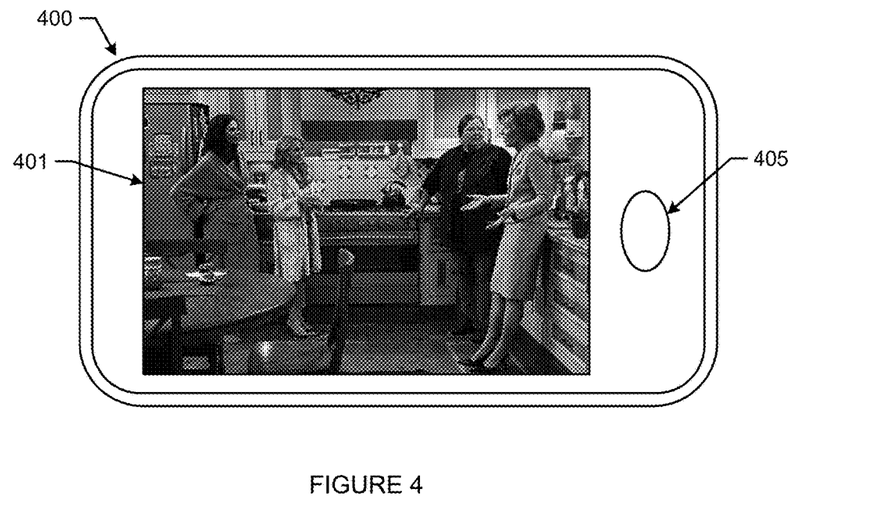
FIGS. 4 and 4A illustrate another example graphical user interface of a camera function of a mobile device.

FIG. 3 illustrates an example method of selecting images from a captured video sequence based on social network information. The example method of FIG. 3 can be implemented by an image selection process hosted by one or more processors of a mobile device (e.g., a camera, a mobile phone, a tablet computer, or other suitable portable devices). In other implementations, the image selection process can be implemented remotely from the mobile device that captured the sequence of video images. In particular embodiments, the image selection process may access a sequence of video frames stored in a buffer (301). In particular embodiments, the sequence of video frames may be associated with a first user. For example, a first user may activate a camera function provided by a mobile device, causing the image selection process (or a child process or a thread of the image selection process) to start storing a real-time video captured by the camera function in a buffer. As illustrated in FIG. 4, a camera function of a mobile device 400 may display the real-time video in a graphical user interface 401 (e.g., a viewfinder) of the camera function in a touch screen of the mobile device. The buffer may be a software buffer of the image selection process, wherein the buffer may occupy a certain region of a physical memory storage (e.g., DRAM). In particular embodiments, the real-time video stored in the buffer may comprise a sequence of video frames. For example, the buffer may comprise a circular buffer or a similar fixed-size data structure that deletes the oldest frames to store the newest frames. The length of the real-time video stored in a circular buffer may depend on a frame rate of the real time video, and/or a resolution of the real-time video. For example, a real-time video stored in a circular buffer may include a sequence of video frames with a resolution of 1920×1080 pixels, between a current time and 10 seconds before the current time. For example, the same circular buffer can store a sequence of a real-time video with a same frame rate and a resolution of 480×360 pixels between a current time and 2 minutes before the current time.

In particular embodiments, the image selection process may receive an indication for persistent storage of a particular frame of the sequence of video frames. For example, the image selection process may receive an indication of photo-capturing of a particular frame (302). For example, the first user may capture a photo by pressing hardware button 405 (as illustrated in FIG. 4), causing the camera function to store a particular frame of the real-time video being captured by the camera function in a local storage (e.g., an SD card) of mobile device 400, while transmitting an identifier or a pointer of the particular frame to the image selection process. Meanwhile, the camera function can continue to capture the real-time video, while the image selection process can continue to store in the buffer the real-time video as a sequence of video frames.

In particular embodiments, the image selection process may analyze frames before or after the particular frame of the sequence of video frames to identify one or more social network objects captured in the frames (303). Using the circular buffer storing 10 seconds of video frames with a resolution of 1920×1080 pixels described above as an example, the image selection process may analyze frames stored in the circular buffer ranging from the particular frame to 10 seconds after the particular frame. For example, the image selection process may copy from the circular buffer frames ranging from 5 seconds before the particular frame to 5 seconds after the particular frame to a data store for further analysis. The one or more social network objects may comprise one or more user nodes in a social graph and corresponding respective users, one or more concept nodes in a social graph and corresponding respective concepts, or any combination of those, as described in U.S. patent application Ser. No. 12/763,171. For example, a social network object can be the first user, a social contact of the first user, or any user of the social networking system. For example, a social network object can be a place, a business, a brand, a product, an organization, a public figure, etc.

In particular embodiments, the image selection process may analyze frames before or after the particular frame of the sequence of video frames to identify one or more users of the social networking system. In particular embodiments, the image selection process may isolate one or more faces in one or more frames before or after the particular frame, and identify one or more users corresponding to the one or more isolated face. U.S. patent application Ser. No. 12/890,283, which describes methods of identifying one or more users corresponding to one or more faces in an image file (e.g., a photo, a video clip) based on spatio-temporal proximity, is herein incorporated by reference for all purposes. In particular embodiments, the image selection process may determine a current location of the first user, and determine a list of users who are at or near the current location. For example, the image selection process can access a GPS sensor of the mobile device (e.g., via a device driver of the mobile sensor) for GPS coordinates corresponding to a current location of the first user. For example, the image selection process can access event database 102 and/or location database 104 (e.g., via an application programming interface or API hosted by System Front End 120) for the first user's current location (e.g., a recent location check-in, a recently recorded GPS location, location data of an event that the first user is currently attending). For example, the image selection process can access event database 102 and/or location database 104 for users who are at or near the current location (e.g., a user who has GPS coordinates within 100 feet from the first user's current location, a user who is attending a same event as the first user, a user who has just checked in to a same location as the first user). For example, the image selection process can access media database 105 to identify one or more users who were tagged with the first user in one or more recently uploaded photos or video clips. Other methods in identifying one or more other users who are at a same location as the first user may include data reports from mobile devices of other users that have interacted with the first user's mobile phone via Bluetooth or Near-Field Communications (NFC) protocols. In one embodiment, the image selection process may further limit the list of users to users who are at or near the current location and are within a pre-determined threshold degrees of separation from the first user (e.g., users who are within two degrees of separation from the first user). For example, the image selection process can access user profile database 101 to determine social relationship between the first user and each of the list of users. The image selection process may identify one or more users corresponding to the isolated faces by matching (e.g., by using a facial recognition algorithm) facial images of the list of users to the one or more isolated faces. For example, the image selection process can access user profile database 101 and/or a local address book (or photo albums) in the mobile device for user profile pictures of one or more users of the list of users, and match the user profile pictures to the one or more isolated faces.

In some embodiments, the image selection process may analyze frames before or after the particular frame of the sequence of video frames to identify one or more users of the social networking system based on audio recorded in the sequence of video frames. In particular embodiments, the image selection process may isolate one or more audio segments in the sequence of video frames. In particular embodiments, the image selection process may determine (e.g., by accessing location database 104) a list of users who are at or near a current location of the first user, and identify one or more users corresponding to the one or more audio segments by matching (e.g., by using an audio recognition algorithm) audio data (e.g., a voicemail left by a user, a video clip tagged to a user) of the list of users to the one or more audio segments. For example, an audio recognition algorithm may transform a waveform of an audio file in time domain to frequency domain by a suitable mathematical transformation (e.g., Fast Fourier Transform, Discrete Cosine Transform, wavelet transform), and extract a "fingerprint" of the audio file in frequency domain. The audio recognition algorithm may determine a match between two audio files by comparing fingerprints of the two audio files. For example, the audio recognition algorithm can determine a match between an unknown audio file (e.g., an audio segment of the sequence of video frames) and an audio file associated with a known identity (e.g., a voicemail left by a user) by comparing a fingerprint of the unknown audio file and a fingerprint of the audio file associated with a known identity.

In other embodiments, the image selection process may analyze frames before or after the particular frame of the sequence of video frames to identify one or more social networking objects other than users of the social networking system. For example, a social networking object can be a place (e.g., Eiffel Tower, Golden Gate Bridge, Yosemite National Park, Hollywood), a business or an organization (e.g., a coffee shop, San Francisco Giants), or a brand or product (e.g., Coca-Cola, Louis Vuitton). The image selection process may determine (e.g., by accessing location database 104) a list of social network objects that are at or near a current location of the first user, and identify one or more social networking objects in one or more frames before or after the particular frame of the sequence of video frames by matching (e.g., by using an object recognition algorithm) images of the list of social networking objects (e.g., photos associated with each of the list of social network objects) to content in the one or more frames. For example, an object recognition algorithm may use optical character recognition techniques to identify one or more characters (e.g., "HOLLYWOOD", "San Francisco Giants") in one or more frames and match against image data (or identity data such as names, logos) of the list of social network objects nearby. For example, an object recognition algorithm may use computer vision techniques to extract a set of features (e.g., edges, corners, ridges, blobs, curvatures, etc.) from an image file. The object recognition algorithm may determine a match between two image files by comparing respective sets of features of the two image files. For example, an object recognition algorithm can determine a match between an unknown image file (e.g., one of the frames) and an image file of a known identity (e.g., an image of Eiffel Tower) by comparing a first set of features of the unknown image file and a second set of features of the image file of a known identity.

In particular embodiments, the image selection process may determine a value of the frames before or after the particular frame of the sequence of frames based on the one or more identified social objects (304). In particular embodiments, the image selection process may score the frames before or after the particular frame based on a number of social network objects identified in each frame of the frames before or after the particular frame. For example, for each frame before or after the particular frame, the image selection process may assign a score being equal to the number of social network objects identified in the frame (e.g., 0, 1, 2, 3, . . . ). In particular embodiments, the image selection process may score the frames before or after the particular frame based on affinity between each of the identified one or more social network objects to the first user. For example, the image selection process can assign each identified social network object an affiliation coefficient (e.g., 1.0 if an identified user is the first user's sibling, 0.9 if an identified user frequently communicate with the first user, 0.3 if an identified user is a second-degree social friend of the first user, or 0.8 for an identified place if the first user frequently checks in to the place, or likes the place page). A system for measuring user affinity is described more generally in U.S. patent application Ser. No. 11/503,093, filed on Aug. 11, 2006, which is hereby incorporated by reference for all purposes. For example, for each frame before or after the particular frame, the image selection process may adjust a score (e.g., the score based on a number of social network objects identified in the frame as described earlier) by multiplying the score by the affiliation coefficient of a social network object identified in the frame. In one embodiment, the image selection process may score the frames before or after the particular frame based on a measurement of popularity of each of the identified one or more social network objects. For example, the image selection process may assign a popularity coefficient for an identified place based on a number of check-ins (or a number of users liking the corresponding place page)—e.g., 1.0 for over 500 check-ins ("extremely popular"), 0.7 for over 100 check-ins ("popular"), and 0.5 for 100 or less check-ins. For example, for each frame before or after the particular frame, the image selection process may adjust a score (e.g., the score based on a number of social network objects identified in the frame as described earlier) by multiplying the score by the popularity coefficient of a place identified in the frame. In another embodiment, the image selection process may score the frames before or after the particular frame based on content of one or more voice segments recorded in the sequence of video frames. For example, the image selection process may analyze content of the voice segments (e.g., by using a speech recognition algorithm) for indication of importance (e.g., "Say cheese!", "Cheese!", "This is beautiful!", "Amazing!"), and adjust a score of a frame (e.g., the score based on a number of social network objects identified in the frame as described earlier) favorably if the frame is associated with a voice segment having indication of importance. Yet in another embodiment, the image selection process may score the frames before or after the particular frame based on picture quality of the frames (e.g., lighting, contrast, facial expression, etc.). For example, the image selection process may analyzing picture quality of a frame (e.g., by using an image process algorithm), and adjust a score of a frame (e.g., the score based on a number of social network objects identified in the frame as described earlier) favorably if the frame has better picture quality. For example, the image selection process may analyzing picture quality of a frame (e.g., blurriness) by accessing a motion sensor (e.g., an accelerometer), and adjust a score of a frame (e.g., the score based on a number of social network objects identified in the frame as described earlier) less favorably if the frame corresponds to a time period of significant vibration or movement of the mobile device.

Figure 4A:
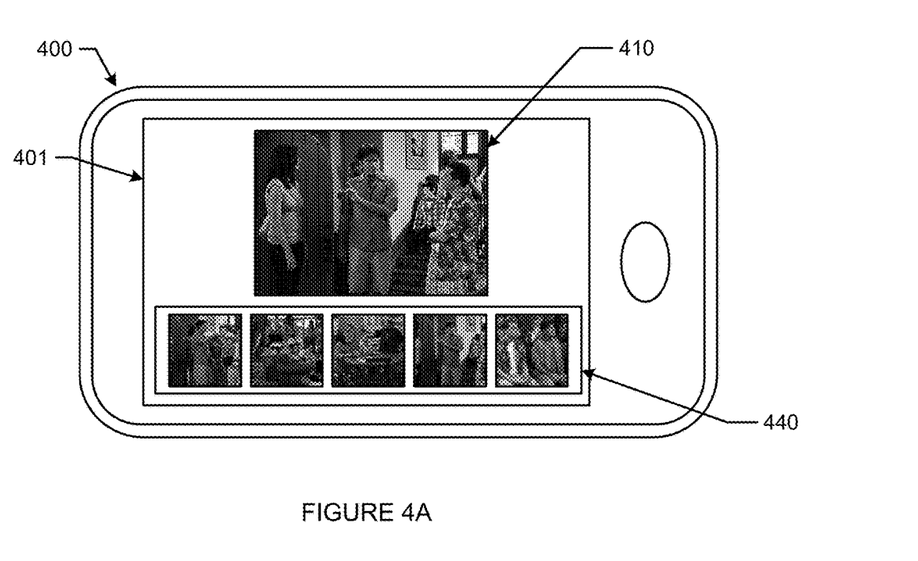

In particular embodiments, the image selection process may select one or more of the frames before or after the particular frame for persistent storage based on respective values of the frames (305). For example, the image selection process may rank the frames before or after the particular frame based on the respective scores of the frames before or after the particular frame as described above, select one or more top ranked frames, and stored the selected frames in a local storage (e.g., an SD card) of mobile device 400. For each selected frame, the image selection process may add to the selected frame's metadata ("tag") one or more social networking objects identified in the selected frame and optionally corresponding tagged regions. The image selection process may also copy at least a portion of metadata of the particular frame (the captured photo) to metadata of the selected frames. In one embodiment, the image selection process may store a video segment (from the sequence of video frames) covering at least the particular frame and the selected frames in a local storage (e.g., an SD card) of mobile device 400. The image selection process may tag one or more social networking objects identified in the selected frames to the stored video segment. The image selection process may also copy at least a portion of metadata of the particular frame (the captured photo) to metadata of the stored video segment. Additionally, in particular embodiments, the image selection process may present the selected frames to the first user. FIG. 4A illustrates another example graphical user interface of the camera function of the mobile device of FIG. 4. For example, the image selection process can cause the camera function to display in its graphical user interface 401 selectable thumbnails corresponding to the one or more selected frames in a scrollable media wheel panel (440) adjacent to the captured photo (410). The media wheel panel allows a user to view and quickly scroll thumbnails corresponding to the selected frames before or after the particular frame (the captured photo). A user can select an thumbnail in the media wheel panel, causing the camera function to display the corresponding frame in graphical user interface 401 (e.g., by displaying the frame corresponding to the selected thumbnail in place of the captured photo). In one embodiment, the image selection process may rank the frames before or after the particular frame based on the respective scores of the frames before or after the particular frame as described above, select one or more top ranked frames, and present the selected one or more tap ranked frames to the first user—e.g., in the scrollable media wheel panel illustrated in FIG. 4B. The first user may select from the scrollable media wheel panel one or more thumbnails, causing the image selection process to store frames corresponding to the thumbnails selected by the first user in a local storage (e.g., an SD card) of the mobile device. The example method of FIG. 3 can be implemented by a server-side process hosted by one or more computing devices of the social networking system. For example, the image selection process or a client application of the mobile device may upload frames before or after the particular frame of the sequence of video frames to the social networking system (e.g., stored in media database 105). A server-side process of the social networking system may analyze the uploaded frames to identify one or more social network objects captured in the frames (303), determine the uploaded frames based on the one or more identified social objects (304), and select one or more of the uploaded frames for persistent storage (e.g., storing the selected one or more frames in media database 105) based on respective values of the uploaded frames (305).

Figure 5:
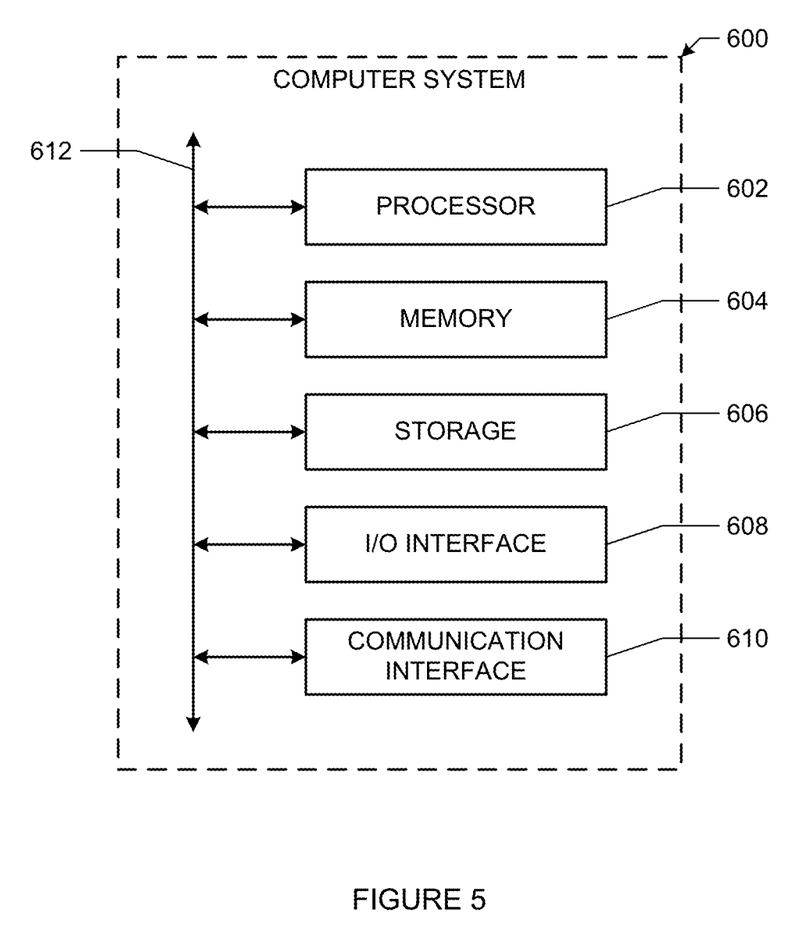
FIG. 5 illustrates an example computer system.

FIG. 5 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a desktop computer system, a mobile computer system, a game console, a mainframe, a mesh of computer systems, a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network (e.g., a 802.11a/b/g/n WI-FI network), a WI-MAX network, a cellular telephone network (e.g., a Global System for Mobile Communications (GSM) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 612 may include one or more buses 612, where appropriate.

Figure 6:
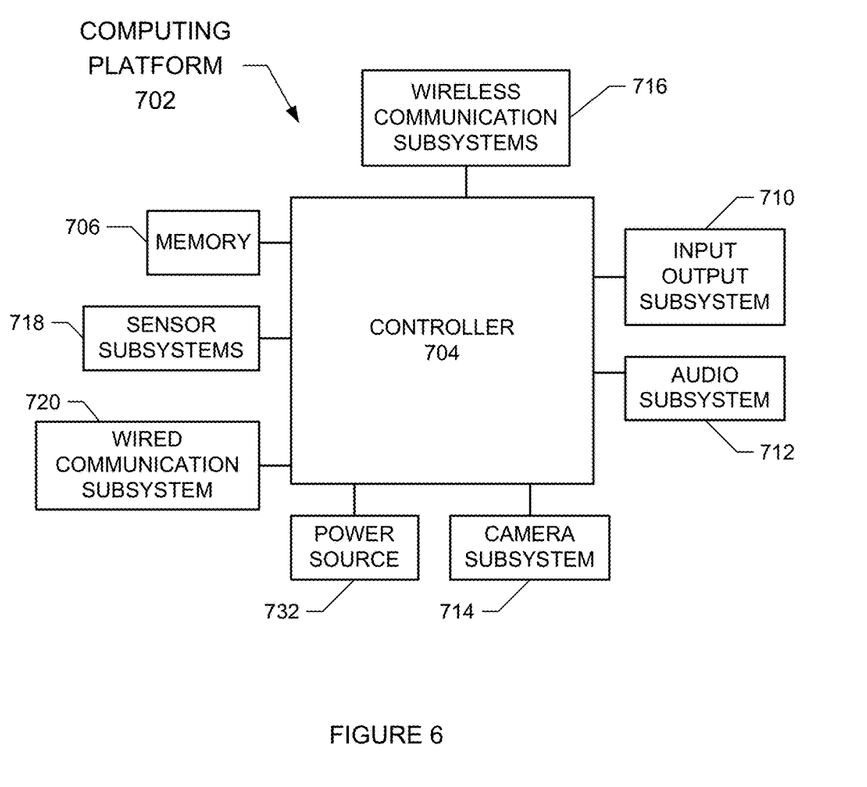
FIG. 6 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 6 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, and/or, display (e.g., liquid crystal display (LCD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (e.g., a BLUETOOTH), a WI-FI network (e.g., an 802.11a/b/g/n network), a WI-MAX network, a cellular telephone network (such as, for example, a Global System for Mobile Communications (GSM) network, a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by a computing device, receiving one or more signals from an input device of a client computing device, the one or more signals comprising user input of an identifier of a selected one of a plurality of video frames within a video sequence;
   by the computing device, analyzing the selected one of the plurality of video frames and a number of video frames occurring within a particular number of seconds before the selected video frame and a number of video frames occurring within a particular number of seconds after the selected video frame to identify one or more social network objects;
   for each frame within the selected one of the plurality of video frames and the number of video frames occurring within the particular number of seconds before the selected video frame and the number of video frames occurring within the particular number of seconds after the selected video frame, computing a value based on the identified social network objects in each frame;
   by the computing device, selecting, based on respective values of the frames, one or more top ranked frames of the selected one of the plurality of video frames and the number of video frames occurring within the particular number of seconds before the selected video frame and the number of video frames occurring within the particular number of seconds after the selected video frame; and
   transmitting, to a display of the client computing device, the one or more top ranked frames.

2. The method of claim 1, wherein, by the computing device, computing the value of each frame in the plurality of video frames of the video sequence further comprises:
   by the computing device, for each frame of the sequence, assigning the value based on a number of social network objects identified in the each frame.

3. The method of claim 1, wherein, by the computing device, computing the value of each frame in the plurality of video frames of the video sequence is further based on an affinity associated with each of the identified social network objects.

4. The method of claim 1, wherein the video sequence is a real-time video.

5. The method of claim 1, wherein at least part of the video sequence is stored in a buffer.

6. The method of claim 1, wherein the user input comprises an indication for persistent storage received by the computing device.

7. One or more computer-readable non-transitory storage media embodying software that is operable when executed by a processor to:
   receive one or more signals from an input device of a client computing device, the one or more signals comprising user input of an identifier of a selected one of a plurality of video frames in a video sequence;
   analyze the selected one of the plurality of video frames and a number of video frames occurring within a particular number of seconds before the selected video frame and a number of video frames occurring within a particular number of seconds after the selected video frame to identify one or more social network objects;
   for each frame within the selected one of the plurality of video frames and the number of video frames occurring within the particular number of seconds before the selected video frame and the number of video frames occurring within the particular number of seconds after the selected video frame, compute a value based on the identified social network objects in each frame;
   select, based on respective values of the frames, one or more top ranked frames of the selected one of the plurality of video frames and the number of video frames occurring within the particular number of seconds before the selected video frame and the number of video frames occurring within the particular number of seconds after the selected video frame; and
   transmit, to a display of the computing device, the one or more top ranked frames.

8. The media of claim 7, wherein to compute the value of each frame in the plurality of video frames of the video sequence, the software is further operable when executed to:
   for each frame of the video sequence, assign the value based on a number of social network objects identified in the each frame.

9. The media of claim 7, wherein computing the value of each frame in the plurality of video frames of the video sequence is further based on an affinity associated with each of the identified social network objects.

10. The media of claim 7, wherein the video sequence is a real-time video.

11. The media of claim 7, wherein at least part of the video sequence is stored in a buffer.

12. The media of claim 7, wherein the user input comprises an indication for persistent storage received by the computing device.

13. A system comprising:
    one or more processors; and
    a memory coupled to the processors comprising instructions executable by the processors, the processors being operable when executing the instructions to:
    receive one or more signals from an input device of a client computing device, the one or more signals comprising user input of an identifier of a selected one of a plurality of video frames of a video sequence;
    analyze the selected one of the plurality of video frames and a number of video frames occurring within a particular number of seconds before the selected video frame and a number of video frames occurring within a particular number of seconds after the selected video frame to identify one or more social network objects;
    for each frame within the selected one of the plurality of video frames and the number of video frames occurring within the particular number of seconds before the selected video frame and the number of video frames occurring within the particular number of seconds after the selected video frame, compute a value based on the identified social network objects in each frame;
    select, based on respective values of the frames, one or more top ranked frames of the selected one of the plurality of video frames and the number of video frames occurring within the particular number of seconds before the selected video frame and the number of video frames occurring within the particular number of seconds after the selected video frame; and transmit, to a display of the client computing device, the one or more top ranked frames.

14. The system of claim 13, wherein to compute the value of each frame in the plurality of video frames of the video sequence, the processors are further operable when executing the instructions to:

for each frame of the video sequence, assign the value based on a number of social network objects identified in the each frame.

15. The system of claim 13, wherein computing the value of each frame in the plurality of video frames of the video sequence is further based on an affinity associated with each of the identified social network objects.

16. The system of claim 13, wherein the video sequence is a real-time video.

17. The system of claim 13, wherein at least part of the video sequence is stored in a buffer.

18. The system of claim 13, wherein user input comprises an indication for persistent storage received by the computing device.

* * * * *